United States Patent Office 3,462,476
Patented Aug. 19, 1969

3,462,476
AMMOXIDATION OF AROMATIC HYDROCARBONS TO AROMATIC NITRILES USING SUBSTANTIAL QUANTITIES OF WATER IN THE REACTION MIXTURE
Joseph P. O'Donnell, Roger M. Butler, and Leander Burton Simpson, Sarnia, Ontario, Canada, assignors to Esso Research and Engineering Company, a corporation of Delaware
Filed Mar. 21, 1966, Ser. No. 535,821
Int. Cl. C07c *121/02, 121/52*
U.S. Cl. 260—465    9 Claims

ABSTRACT OF THE DISCLOSURE

In a process for the preparation of aromatic nitriles, e.g., terephthalonitriles, from substituted aromatics, e.g., xylenes, by passing the substituted aromatic in admixture with ammonia and oxygen over a suitable catalyst, e.g., chromia-alumina, a significant increase in aromatic nitrile yield and ammonia selectivity can be realized by adding relatively large quantities of water to the reaction mixture.

---

This invention relates to the preparation of aromatic nitriles. More particularly, this invention relates to an improvement in the method for preparing aromatic nitriles by the catalytic oxidation of aromatic hydrocarbons in the presence of ammonia and oxygen.

Aromatic nitriles are presently of great interest as intermediates for the preparation of aromatic acids, amines, and the like, which are used in the manufacture of synthetic resins and fibers.

The prior art has recognized several methods for preparing aromatic nitriles, among which are: the reaction of aromatic diazonium compounds with cyanides; dehydration of either ammonium salts of aromatic acids or amides; and, the ammoxidation process, i.e., partial catalytic oxidation of substituted aromatics in the presence of ammonia and oxygen. All of these processes start with aromatic hydrocarbons; however, the only direct route to aromatic dinitriles lies with the ammoxidation process. This process is usually carried out at elevated temperatures, in the gaseous phase, and in the presence of a suitable catalyst. The catalysts are generally of the class of variable valent heavy metals and their oxides which are capable of partially oxidizing aromatic hydrocarbons. Typical examples of these catalysts are the oxides of vanadium, molybdenum, columbium, chromium, tungsten, uranium, manganese, copper, iron, cobalt, and nickel. However other catalysts may also be used, e.g., phosphoric acid, boron oxides, etc. The catalysts are usually suitably supported, e.g., on alumina. Ammoxidation processes incorporating such variations as: synergistic catalyst combinations, specialized catalyst preparation techniques, and fluidized catalyst beds have proved moderately successful in increasing aromatic nitrile yields. However, two major disadvantages were readily apparent in the ammoxidation process. Firstly, selectivity to aromatic nitriles and the resulting yield of aromatic nitriles were both relatively low. Secondly, large amounts of ammonia, considerably in excess of the stoichiometric requirement, were necessary in order to obtain reasonable nitrile yields based on the aromatic hydrocarbon. It is now possible, by the practice of the present invention, to achieve exceedingly high yields and selectivities to aromatic nitriles based on either aromatic hydrocarbon or ammonia; and, in many cases, to obtain these yields and selectivities with nearly stoichiometric amounts of ammonia.

It is one object of this invention, therefore, to provide an ammoxidation process whereby stoichiometric or nearly stoichiometric amounts of ammonia may be used in the preparation of aromatic nitriles. It is another object of this invention to provide a process for the preparation of aromatic nitriles in high yields and selectivities to the aromatic nitriles based on both ammonia and aromatic feedstock at high conversions. It is yet another object of this invention to provide a continuous ammoxidation process for the preparation of aromatic nitriles. These and other objects will become apparent from the following description of the invention.

Briefly stated, the objects of this invention may be accomplished by the intentional addition of substantial quantities of water to the hydrocarbon, ammonia, and oxygen reaction mixture. The reaction is then conducted at elevated temperatures, in the vapor phase, in the presence of a suitable ammoxidation catalyst, i.e. variable valent heavy metal oxide. The vaporous reaction product is cooled to condense the solid nitriles, which are then separated from the product stream, and purified by fractionation or other means, if required. The addition of substantial quantities of water greatly increases the selectivity for the conversion of ammonia to nitrile and in many cases allows the use of stoichiometric or nearly stoichiometric ratios of ammonia to aromatic hydrocarbon in the feed. It is believed that the large consumptions of ammonia, previously required, were necessary because of the combustion of ammonia in the reaction zone, to form nitrogen and water vapor; consequently, reducing the amount of ammonia available for selective conversion to the aromatic nitrile. It has now been found that the addition of substantial quantities of water with the reactants, precludes to a considerable extent this wasteful ammonia combustion, thereby allowing almost all of the ammonia which is converted to be utilized in production of the aromatic nitrile. Furthermore, the addition of substantial quantities of water materially enhances the aromatic nitrile yield from the ammoxidation process. Thus, conversions of an aromatic hydrocarbon feedstock of about 50%, more preferably about 80%, and under optimum conditions 90% or more, can be expected with selectivities to total nitrile exceeding 90% based on the aromatic hydrocarbon and ammonia.

The advantages and operation of this invention will be more clearly understood from a description of the process with reference to the attached drawings.

Figure 1:
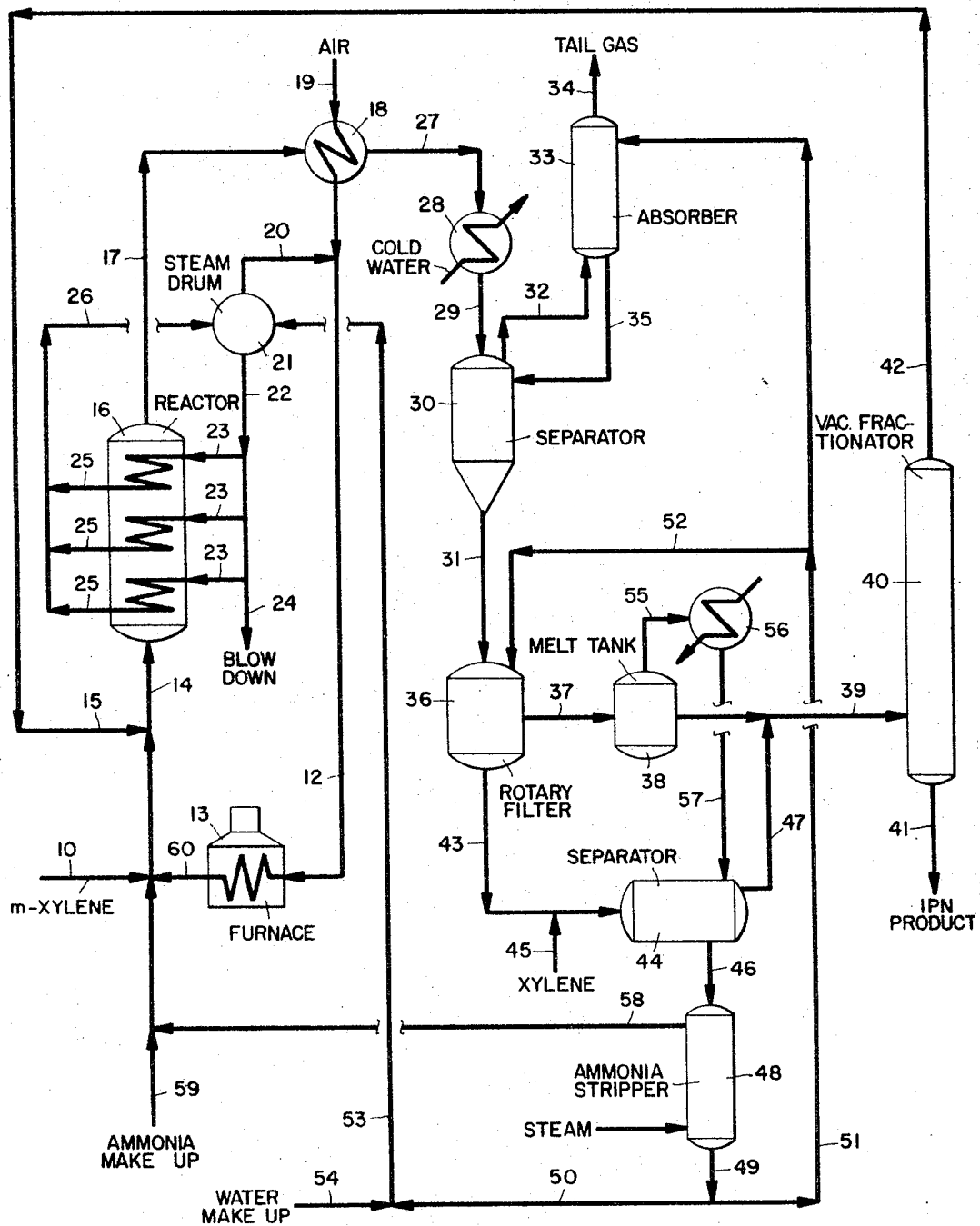
FIGURE 1 is a schematic flow plan for the continuous ammoxidation of substituted aromatic feedstocks. The preparation of terephthalonitrile from p-xylene or isophthalonitrile from m-xylene may be accomplished under these conditions.

Turning now to FIGURE 1, reactor 16 contains a fluidized catalyst bed of chromia and vanadia supported on alumina. Reactor 16 may alternatively be a fixed bed reactor or a tubular reactor. The reactor feed, introduced by line 14 consists of fresh m-xylene in line 10, recycled m-xylene and tolunitrile in line 15, fresh ammonia in line 59, recycle ammonia in line 58, and a heated steam-air mixture in line 60. The reaction takes place in reactor 16 at temperatures of about 400–500° C. with the liberation of a considerable amount of heat. Reactor 16 may be externally cooled by water or other suitable coolants. However, an efficient method for a continuous process utilizes recycle water from steam drum 21 to remove the heat of reaction by flowing water through coils 23 in the reaction zone. The water is partially converted to steam and recovered in lines 25 at a temperature of about 130–200° C., and 20–200 p.s.i.g. The water-steam mixture is returned to steam drum 21 by line 26 where the steam is separated out through line 20. A portion of the water is discarded by line 22, 24 in order to prevent the accumulation of nonvolatile solids such as polymers and the like. The vaporous reactor effluent in line 17 containing unconverted xylene and ammonia, tolunitrile, isophthalonitrile, steam, carbon dioxide, and tail gases, e.g., unconverted oxygen and nitrogen, is passed to heat exchanger 18 where air, line 19, at ambient temperatures, e.g., −40 to 30° C., cools the 400–500° C. reactor effluent to a temperature just above its dew point, i.e., 150–200° C., e.g., 190° C. all of the stream remaining in the vapor phase. The air is heated to about 350–450° C. at its outlet and is mixed with steam from steam drum 21 in line 20. The air-steam mixture in line 12 is introduced to furnace 13 where the remainder of the reaction preheat is supplied. The vaporous mixture leaving furnace 13 in line 60 is then at about 400–500° C., e.g., reaction temperatures, when it is mixed with feed to the reactor in line 14. Since the moles of steam and air will be relatively high compared to the moles of ammonia and xylene, little or no additional heat is required to maintain reaction conditions through the reactor. It is also possible that under optimum conditions furnace 13 may be bypassed or eliminated. This arrangement utilizes the heat of reaction to furnish all of the heat required for the process. It will be obvious to those skilled in the art that many variations of this arrangement can be easily suggested. One such variation (not shown) utilizes a salt cooled tubular reactor. Part of the reactor may be used for preheating the feed or an external heat exchanger may be employed for this purpose. The reactor is cooled by circulating salt around the reactor tubes. A steam boiler, into which recycled and makeup water are introduced, is heated by the hot salt from the reactor which is continuously cycled from reactor to steam boiler and back to reactor.

Returning now to FIGURE 1, the cooled vaporous product steam from heat exchanger 18 is passed via line 27 to condenser 28 where cold water is utilized to condense about 99% of the solid phthalonitrile products. It will be obvious to those skilled in the art that a scraped surface condenser, as well as other forms of condensers may be used, e.g., direct condensers involving the mixing of the cold water with the vapor; swing condensers similar to those employed in phthalic anhydride plants; and, "haybarns" of the type used for phthalic anhydride. (It is possible to gain additional preheat by using recycle process water in this step.) The product mixture leaves condenser 28 by line 29 and enters separator 30. Tail gases comprising oxygen, nitrogen, and carbon dioxide are taken off by line 32 and passed to absorber 33 where water in line 51 takes out any ammonia in the stream for recycle back to separator 30 by line 35. The tail gases are expelled from the system by line 34. Separator 30 can be a vertical cylindrical vessel fitted with a conical bottom and an agitator to keep the solids suspended. Absorber 33 can be a separate piece of equipment as shown, or alternatively, could be built directly above separator 30. The product slurry leaves separator 30 by line 31 and enters rotary filter 36 where the solid phthalonitriles are filtered out and washed with process water from line 52. The solid nitriles in line 37 are passed to melt tank 38 where the product is liquefied at temperatures of about 150–250° C. The liquid nitriles are passed by line 39 to fractionator 40 operating at about 170–250° C. bottoms temperature and about 100–450 mm. Hg absolute. The overhead product comprises unconverted xylene and tolunitrile and is recycled by line 42. The isophthalonitrile product is recovered as a bottoms fraction in line 41. The product may be further purified by distillation, sublimation, solvent recrystallization, etc.

In operating a continuous process of this nature it is economically important to recover the water and any excess ammonia utilized in the reaction. Thus, the filtrate from filter 36 is passed by line 43 to separator 44 which may be a gravity settler or a centrifuge. Vapors from melt tank 38 are passed to a condenser 56 by line 55 and transferred by line 57 to separator 44. Fresh xylene from line 45 may be used to facilitate the separation of components in separator 44 into an aqueous phase comprising dissolved gases, ammonia, and water and an organic phase comprising xylene, tolunitrile, and small amounts of isophthalonitrile. The organic phase is withdrawn by line 47 and joined with line 39 as the feed to fractionator 40. The aqueous phase is withdrawn from separator 44 by line 46 and passed to an ammonia stripper 48. Ammonia is stripped by steam to prevent solids deposition and recovered as an overhead mixed with small amounts of carbon dioxide and water, and recycled by line 58. Water is recovered in line 49, a portion being recycled by line 50, the remainder being passed by line 51 for use as filter wash liquid in line 52 and to scrub ammonia from the tail gases in line 51.

Figure 2:
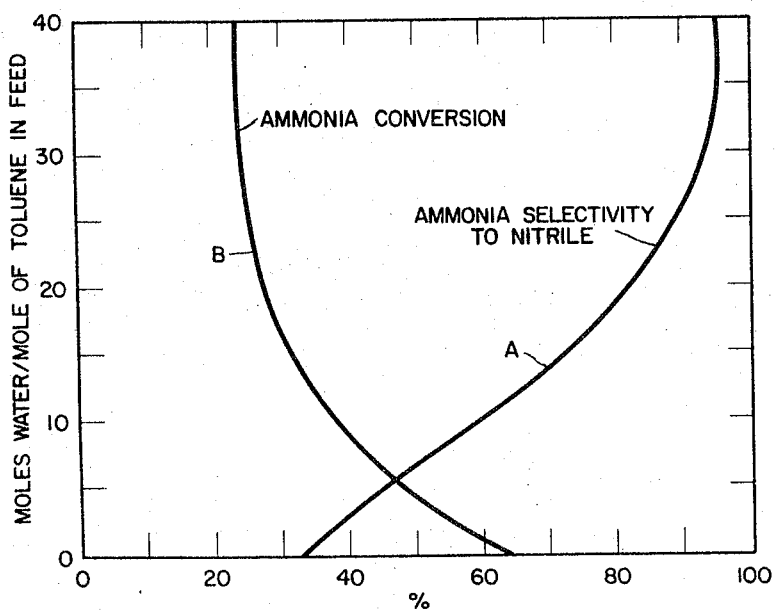
FIGURE 2 is a graphical representation of increasing nitrile sececivity and decreasing ammonia conversion as a function of added water.

FIGURE 2 graphically depicts the increase in nitrile selectivity, based on ammonia, and decrease in ammonia conversion, both as functions of increasing water additions to the feed, in the ammoxidation of toluene to benzonitrile. Curve A shows the nitrile selectivity based on ammonia. In some prior processes water was used as a diluent in minor amounts, e.g., about 1 mole/mole hydrocarbon. However, the unexpected improvement in aromatic nitrile yield and selectivity, when substantial quantities of water are added, remained undiscovered until the present invention. It is noteworthy to point out the increasing slope of curve A with increasing water additions. Curve B shows the decrease in ammonia conversion with increasing water additions. This result is in agreement with the previously proposed theory concerning the effect of substantial quantities of water in the reaction zone, i.e., large amounts of water prevent ammonia from being consumed in the reactor. Thus, stoichiometric amounts of ammonia are selectively converted to the aromatic nitrile and excess ammonia is passed through the reactor rather then being converted to nitrogen and water vapor. Consequently, in circumstances where it is desirable to use more than stoichiometric ammonia requirements, the excess ammonia can be recovered, as described in FIGURE 1, and reused.

In general, the ammoxidation process of this invention can employ a wide variety of aromatic feedstocks. These feedstocks may be broadly characterized as substituted alkyl or alkenyl aromatics of the benzene and naphthalene series and mono-halogenated derivatives thereof. Preferred, however, are the lower alkyl substituted aromatics and mono-halogenated derivatives thereof wherein the alkyl substitutent contains 1–4 carbon atoms. Particularly preferred are $C_7$–$C_{10}$ aromatics and mono-halogenated derivatives thereof; still more particularly preferred are the $C_7$–$C_9$ aromatics, e.g. toluene, ethylbenzene, the xylenes, and mono-halogenated derivatives thereof, e.g. chlorotoluene. Further specific examples of substituted aromatics applicable to the present invention are shown in Table I along with their corresponding nitrile products. However, this table is not to be construed as limiting this invention in any way.

TABLE I.—AMMOXIDATION FEEDSTOCKS AND PRODUCTS

| Feed | Nitrile product |
| --- | --- |
| Toluene | Benzonitrile. |
| p-Xylene | p-Tolunitrile, terephthalonitrile. |
| m-Xylene | m-Tolunitrile, isophthalonitrile. |
| o-Xylene | o-Tolunitrile, phthalonitrile, phthalimide. |
| Mesitylene | Trimesic acid nitriles, tricyano benzene. |
| Ethyl benzene | Benzonitrile. |
| p-Cymene | p-Tolunitrile, p-isopropyl benzonitrile, terephthalonitrile. |
| Chlorotoluene | Chlorobenzonitrile. |
| Alpha-methyl naphthalene | Alpha-cyanonaphthalene, phthalonitrile. |

Additionally, trimethyl benzenes, cumene, and the like may also be used to prepare various other nitrile products. As can be seen from the foregoing table, the process is equally applicable to the preparation of mono- and dinitriles.

One of the particularly important advantages of this invention is the use of nearly stoichiometric amounts of ammonia in preparing the aromatic nitrile. For example, in the preparation of benzonitrile, ammonia selectivities and yields of benzonitrile in excess of 90% can be achieved with a mole ratio of ammonia to toluene of about 1.2:1, when substantial quantities of water are added to the feed. Other processes have recommended ammonia to toluene ratios ranging from 2:1 up to 10:1. Under some circumstances, however, it will be desirable to use ammonia in greater than stoichiometric quantities to achieve the high yields and selectivities. In such circumstances, the ammonia will not be lost to the process by combustion, as previously, but it may be recovered and reused. Thus, although excess ammonia may be required, nitrile yields will still be higher than previously thought possible and most of the excess ammonia can be recovered. Under normal circumstances, the molar ratio of ammonia to aromatic hydrocarbon will vary from stoichiometric to about 1000% excess, with a range of stoichiometric to about 500% excess being preferred, and stoichiometric to 400% excess, e.g., 350% particularly preferred. It is also possible to utilize a primary alkyl amine or hydrogen cyanide in place of ammonia and in the same molar ratios. However, this would lead to carbon impurities in the reactor, and ammonia is particularly preferred for use.

Oxygen may be supplied to the process as molecular oxygen, air, air-oxygen mixtures, or inert gas-oxygen mixtures, such as: nitrogen-oxygen, argon-oxygen, and the like. Air, however, is preferred because of its ready availability. The molar ratio of oxygen to hydrocarbon, regardless of the oxygen carrier, should range from about 1.5/1 to 20/1, while a ratio of 10/1 to 15/1 is preferred, e.g. 13/1.

The remarkable results of this invention, i.e., greater yields and selectivity to nitriles, more efficient use of ammonia, are due to the addition of substantial quantities of water to the feed stream. In general, the minimum amount of water added will be that amount consistent with high yields of the nitrile based on both hydrocarbon and ammonia. The amount of water added, however, is critical to the extent that at least 5 moles/mole of hydrocarbon must be added to gain the benefits of the addition. Thus, water additions may range from about 5 to about 50 moles per mole of hydrocarbon, with molar ratios of 15–40 moles per mole hydrocarbon being preferred, 20–40 moles/mole particularly preferred, and 30–40 moles/mole still more particularly preferred.

The water may be added to the reaction in the liquid or vapor phase and at any convenient point in the process. For example, the water may be heated and converted to steam by the heat of reaction and added to the reactor as steam, or an external heat exchanger may be utilized to convert the water to steam. As another, and preferred method, the water may be injected directly into the reactor in the liquid phase. The heat of reaction will convert the water to steam, thus providing a cooling effect together with the advantages of this invention.

Many catalysts have been found suiable for promoting the ammoxidation reaction. In general, the advantages of this invention will be obtained with any suitable ammoxidation catalyst. Among the more widely used catalysts are the variable valent heavy metal oxides, such as: vanadium pentoxide, chromium oxide, molybdenum oxide, and tungsten oxide used either separately or in combinations containing various proportions of at least two of the foregoing oxides. Other catalysts utilizing transition metal oxides as well as those disclosed in U.S. Patents 2,499,055 and 3,079,422 may also be used. However, combinations of these oxides with materials such as silicon carbide or platinum have also produced satisfactory results. The catalysts may be employed in fixed beds or fluidized beds, supported or unsupported. When supported, materials such as alumina, pumice, brick, Carborundum, low surface area silica gel, and the like may be used. Supported catalysts should normally contain about 1–25 wt. percent of the catalytically active ingredients relative to the supporting material, preferably 1–10 wt. percent. Preferred as a catalyst is the supported combination of vanadium pentoxide and chromium oxide, particularly when the molar ratio of vanadium pentoxide to chromium oxide ranges from about 1:1 to about 1:2. Also preferred as supported catalysts for this reaction are tungsten oxide and mixtures containing various proportions of vanadium pentoxide with molybdenum oxide, tungsten oxide, or potassium pyrosulfate.

The amount of catalyst present will depend primarily on the type of reactor, e.g., fixed or fluid bed, temperatures, and feedstock utilized. Normal hydrocarbon space velocities will range from about 0.01 to 0.3 pound of hydrocarbon per pound of catalyst per hour, with a preferred range of 0.03 to 0.12.

The reaction may take place over a moderately wide temperature range at pressures somewhat above atmospheric, preferably 15 to 200 p.s.i.g. Temperatures in the range of about 300° C. to 650° C. may be utilized, while 370° C. to 510° C. is preferred. Temperature requirements may vary widely within the broad range as a result of feedstocks, catalysts, etc. Because of the requirement of compressing large quantities of air, pressures will normally be only slightly above atmospheric and will be controlled largely by pressure drop considerations.

The following examples serve to further illustrate this invention.

EXAMPLES 1–10

The following results were obtained utilizing a continuous flow apparatus in which the catalyst was contained in a ¼-inch OD stainless steel reactor tube embedded in a block of aluminum fitted with an immersion heater. Mixtures of air, toluene, and ammonia were passed through the reactor tube and samples of feed and product were analyzed. Ammonia in feed and product was analyzed by titration; toluene and benzonitrile were analyzed by means of a directly coupled chromatograph. In all cases the catalyst used was 5 wt. percent $CrO_3$+5 wt. percent $V_2O_3$ on $Al_2O_3$ having a surface area of 0.5 m.$^2$/g. The hydrocarbon weight hourly space velocity was 0.06 g. of feed per g. catalyst per hour, and the mole ratio of oxygen, in the feed, to toluene was 13:1.

Table II shows the effect of ammonia to toluene mole ratio in the absence of added water. It is noteworthy that it was necessary to add a considerable excess of ammonia in order to obtain reasonable yields of benzonitrile based on toluene.

TABLE II.—EFFECT OF AMMONIA TO HYDROCARBON RATIO, DRY FEED

[Temperature 450°C.]

| Example No. | NH₃/toluene | | Percent conversion | | Percent selectivity to nitrile | |
|---|---|---|---|---|---|---|
| | In feed | In product[1] | Toluene | NH₃ | Toluene | NH₃ |
| 1 | 0.6 | 0.06 | 93.5 | 90.0 | 1.1 | 2.0 |
| 2 | 2.4 | 0.06 | 88.0 | 97.7 | 1.5 | 0.6 |
| 3 | 7.5 | 3.4 | 69.6 | 55.0 | 85.2 | 14.4 |

[1] Based on feed toluene.

Table III shows the effect of adding increasing amounts of water to the feed. The ammonia to toluene ratio was maintained constant at 4.2:1. In Example 8 of this table it will be seen that the conversion of ammonia increased sharply corresponding to a sharply decreased selectivity to benzonitrile when water was not added to the feed, thus leading to the conclusion that ammonia was consumed during the reaction but not for the production of benzonitrile.

hr. In the following table, TN refers to tolunitriles and IPN refers to isophthalonitriles.

TABLE V.—AMMOXIDATION OF m-XYLENE-EFFECT OF WATER

| Example No. | Catalyst, mole percent | Wt. percent active ingredients | Water/xylene, mole/mole | Temperature, °C. | Mole percent selectivity | | | |
|---|---|---|---|---|---|---|---|---|
| | | | | | To nitriles on ammonia | To TN on xylene | To IPN on xylene | Total nitriles on xylene |
| 11 | 33 V₂O₅ | 10 | 0 | 495 | 30 | 1 | 81 | 82 |
| 12 | 67 CrO₃ | | 39 | | 95 | 1 | 95 | 96 |
| 13 | 70 V₂O₅ | 10 | 0 | 485 | 23 | 4 | 64 | 68 |
| 14 | 30 MoO₃ | | 39 | | 38 | 5 | 60 | 65 |
| 15 | 85 V₂O₅ | 10 | 0 | 425 | 30 | 7 | 60 | 67 |
| 16 | 15 WO₃ | | 39 | | 62 | 3 | 70 | 73 |
| 17 | 100 WO₃ | 10 | 0 | 535 | 22 | 12 | 64 | 76 |
| 18 | | | 39 | | 33 | 10 | 56 | 66 |
| 19 | 70 V₂O₅ | 10 | 0 | 500 | 15 | 19 | 30 | 49 |
| 20 | 30 MoO₃ | | 39 | | 18 | 8 | 50 | 58 |

TABLE III.—EFFECT OF ADDITION OF WATER TO THE FEED
[Temperature 500° C.]

| Example No. | H₂O/ toluene in feed | Percent conversion | | Percent selectivity to nitrile | |
|---|---|---|---|---|---|
| | | Toluene | NH₃ | Toluene | NH₃ |
| 4 | 0 | 93.1 | 63.1 | 92.3 | 31.9 |
| 5 | 5.0 | 96.7 | 47.6 | 94.8 | 46.3 |
| 6 | 20 | 94.8 | 27.7 | 95.1 | 82.4 |
| 7 | 39 | 95.8 | 23.9 | 99.2 | 95.9 |
| 8 | 0 | 90.8 | 54.5 | 93.8 | 36.1 |

Table IV shows that the ammonia to toluene ratio may approach the stoichiometric requirement with no loss in yield or selectivity. In both examples, the water to toluene ratio was 39:1.

TABLE IV.—EFFECT OF AMMONIA TO HYDROCARBON RATIO WITH WATER IN THE FEED
[Temperature 480° C.]

| Example No. | NH₃/toluene | | Conversion percent | | Percent selectivity to nitrile | |
|---|---|---|---|---|---|---|
| | In feed | In product | Toluene | NH₃ | Toluene | NH₃ |
| 9 | 4.4 | 3.3 | 96.5 | 23.8 | 102.2 | 94.2 |
| 10 | 1.2 | 0.08 | 98.9 | 93.3 | 99.1 | 88.1 |

EXAMPLES 21–24

Table VI shows results obtained utilizing 10 wt. percent of 50:50 mole percent mixture of potassium pyrosulfate-vanadium pentoxide catalyst deposited on an alumina base having a surface area of 5.6 m.²/g. Oxygen to ammonia to m-xylene mole ratio was 13:8:1 and flow rate was 0.03 w./w./hr. In the following table, TN refers to tolunitriles and IPN refers to isophthalonitriles.

TABLE VI

| Example No. | Water/xylene, mole/mole | Temp., °C. | Ammonia | | | | Xylene | | | | |
|---|---|---|---|---|---|---|---|---|---|---|---|
| | | | | Mole percent selectivity | | | | Mole percent selectivity | | | |
| | | | Conversion | TN | IPN | Total nitriles | Conversion | CO² | TN | IPN | Total nitriles |
| 21 | 0 | 400 | 38 | 3 | 40 | 43 | 90 | 36 | 9 | 65 | 74 |
| 22 | 36 | 415 | 14 | 5 | 90 | 95 | 90 | 15 | 10 | 75 | 85 |
| 23 | 36 | 403 | 8.7 | 21.4 | >75 | >90 | 81.0 | 4.6 | 19.8 | 75.6 | 95.4 |
| 24 | 36 | 425 | 11.6 | 9.2 | >90 | >95 | 89.3 | 13.7 | 10.3 | 76.0 | 86.3 |

The results shown in Table VI again show the decrease in ammonia conversion and corresponding increase in nitrile selectivities relative to both ammonia and xylene when water is added to the feed. It is also interesting to note the decrease in CO₂ formation when water is employed.

EXAMPLES 25–26

Table VII below compares the effect of water in the ammoxidation of toluene to benzonitrile as against a pure diluent in the reaction mixture, i.e., nitrogen. A chromiavanadia catalyst supported on alumina was utilized. The molar ratio of oxygen to toluene was 14:1, ammonia to toluene was 1.1:1; temperature was 490° C., and a flow rate of 0.06 w./w./hr.

TABLE VII

| Example No. | Added component | Moles/mole, xylene added | Ammonia converted, percent | Ammonia selectivity to nitrile, percent | Toluene converted, percent | Toluene selectivity to nitrile, percent | Benzonitrile yield on toluene, percent |
|---|---|---|---|---|---|---|---|
| 25 | Water | 39 | 91.7 | 85.1 | 98.1 | 92.2 | 91.0 |
| 26 | Nitrogen | 39 | 93.5 | 68.4 | 90.1 | 82.3 | 74.1 |

EXAMPLE 11–20

Table V shows the results of conducting the ammoxidation of m-xylene with various catalysts and the increase in selectivity that may be obtained when utilizing water additions. The ammonia to xylene mole ratio was 8.5:1; the oxygen to xylene mole ratio was 13.5:1. All catalysts were supported on an Alcoa T-71 Al₂O₃ base. The hydrocarbon weight hourly space velocity was 0.05 w./w./

Thus, it is readily apparent from the nitrile yield and selectivity data that water functions more than as a mere diluent, but markedly improves the reaction yields.

What is claimed is:
1. In a process for the preparation of aromatic nitriles which comprises the vapor phase oxidation, wherein the reaction temperature ranges from about 300° C. to about 650° C., of a feedstock selected from the group con- sisting of benzene substituted with from 1 to 3 lower alkyl groups, benzene substituted with from 1 to 3 monohalogen substituted lower alkyl groups, and mono-lower alkyl substituted naphthylene, in the presence of ammonia and oxygen and a catalyst selected from the group consisting of tungsten oxide, tungsten oxide and vanadium pentoxide, vanadium pentoxide and chromium oxide, vanadium pentoxide and molybdenum oxide, and vanadium pentoxide and potassium pyrosulfate, the improvement which comprises adding about 5–50 moles of water per mole of feedstock to the feed.

2. The process of claim 1 wherein about 15–40 moles of water per mole of aromatic is added to the feed.

3. The process of claim 1 wherein the ammonia is present in amounts ranging from stoichiometric to about 1000 mole percent excess.

4. The process of claim 1 wherein the catalyst consists essentially of vanadium pentoxide and chromium oxide supported on alumina and containing about 1–25 wt. percent of the catalytically active ingredients.

5. The process of claim 1 wherein the feedstock is toluene.

6. The process of claim 1 wherein the ammonia is present in about stoichiometric requirements based on the feedstock.

7. The process of claim 1 wherein the feedstock is a xylene.

8. The process of claim 1 wherein the molar ratio of oxygen to feedstock is about 1.5:1 to 20:1.

9. The process of claim 1 wherein the aromatic nitriles are recovered by cooling the reaction product to precipitate the nitriles and condense a liquid product comprising water and ammonia, and the water and ammonia are independently recovered and recycled to the reaction.

References Cited

UNITED STATES PATENTS

| | | | |
|---|---|---|---|
| 2,828,325 | 3/1958 | Hardy | 260—465 |
| 2,833,807 | 5/1958 | Farkas et al. | 260—465 |
| 2,904,580 | 9/1959 | Idol | 260—465.3 |
| 3,354,197 | 11/1967 | Callahan et al. | 260—465.3 |
| 3,254,110 | 6/1966 | Sennewald et al. | 260—465.3 |

OTHER REFERENCES

Lange: Lange's Handbook of Chemistry, revised tenth edition, pp. 490, 491, 560, 561, 682, 683, 714, 715, 728, 729, 738—741 (1967).

JOSEPH P. BRUST, Primary Examiner

S. T. LAWRENCE III, Assistant Examiner